United States Patent [19]

Sundberg

[11] 4,025,701

[45] May 24, 1977

[54] LEAD STORAGE BATTERY ELECTRODE AND METHOD

[75] Inventor: Erik G. Sundberg, Stockholm, Sweden

[73] Assignee: Aktiebolaget Tudor, Stockholm, Sweden

[22] Filed: Apr. 15, 1975

[21] Appl. No.: 568,168

Related U.S. Application Data

[63] Continuation of Ser. No. 350,653, April 12, 1973, abandoned.

[30] Foreign Application Priority Data

Apr. 18, 1972 Sweden .............................. 724998

[52] U.S. Cl. ................................ 429/140; 429/238
[51] Int. Cl.² .......................................... H01M 4/75
[58] Field of Search .................... 136/43, 53–55, 136/62, 63, 16, 147, 75; 429/140, 238

[56] References Cited

UNITED STATES PATENTS

| | | | |
|---|---|---|---|
| 3,081,368 | 3/1963 | Wunsche | 136/43 |
| 3,082,280 | 3/1963 | Sundberg et al. | 136/43 |
| 3,207,632 | 9/1965 | Dickover et al. | 136/16 |

FOREIGN PATENTS OR APPLICATIONS 425    11/1897    United Kingdom ................. 135/55

Primary Examiner—Anthony Skapars
Attorney, Agent, or Firm—Burns, Doane, Swecker & Mathis

[57] ABSTRACT

Tube plate type electrode for a storage battery where the metal rod of said tube is held centrally in a surrounding sheath by spacing fins. The surface of the spacing fins is coated with a lacquer to reduce the peak effect caused by high current density to prolong the life of the tube sheath.

3 Claims, 4 Drawing Figures

LEAD STORAGE BATTERY ELECTRODE AND METHOD

This is a continuation of application Ser. No. 350,653, filed Apr. 12, 1973, now abandoned.

The present invention relates to an improved electrode for lead-acid storage batteries, and more particularly to an improved internal construction of a tube as used in a positive plate electrode.

Tube electrodes are frequently used as the positive electrodes in lead-acid storage batteries. The number of tubes per electrode ranges as a rule between 11 and 19. Each tube is surrounded by an external sheath which may be of any suitable construction such as a braided glass fiber sleeve surrounded by a perforated plastic foil, or a woven sheath of the so-called cartridge belt type. The sheaths may have any geometric cross section, e.g., a circle, square, rectangle, or ellipse.

The individual tubes may also be independent of each other, or they may be associated in the case of the cartridge belt. Alternatively, the tubes may comprise channels where two flat plates are joined by a plurality of narrow strips separating the enclosed region into individual tubes. Inside the sheaths there is the active material which, in positive lead storage battery electrodes, is composed substantially of lead dioxide. Generally, a conductor is disposed centrally in the tube to be surrounded by the active material. This conductor consists of a metal that is satisfactorily conductive and that is resistant to conditions that exist inside the battery. In a lead-acid storage battery, the conductor usually is a lead rod. The conductors are generally provided with spacers or spacing fins which are intended to hold the conductor centered in the sheath, as shown for example in U.S. Pat. No. 3,429,752. Usually, these spacing fins are an integral part of the conductor, and are produced by making the mold for the conductor such that the conductor is provided with spacing fins of the same material as the conductor.

It has been found, however, that the tube sheaths have a tendency to crack at the region where the spacing fins are applied. This is particularly true in the case of the spacing fins that have edges turned toward the electrode of opposite polarity. The cracks in the sheath allow the active material to expand which causes poor contact between the active material and the conductor, and in addition, a loss of active material from the electrode to the bottom of the battery casing. This, in turn, leads to a reduced quantity of active material on the positive plate and increased risk of short circuit on the lower edge of the plate. The end result is that the capacity of the battery gradually decreases and the life expectancy of the battery is shortened unnecessarily.

There are two possible effects which are believed to be responsible for the cracking of the tube in the region immediatedly at the spacers. One is that there is a so-called peak effect at these spacers due to the distance between the materials that are good electric current conductors in the two different electrode layers being the shortest, which leads to maximum current density. The greater current density in turn entails a greater consumption of the active material right around the spacers, and hence there are greater changes of volume during charging and discharging than occurs elsewhere in the electrode tube. The stresses resulting from the increase in volume cause the tube to crack. The other possible effect is that the spacing fins chemically convert to active material. The conductor, and especially the spacing fins, are exposed to corrosion caused by contact with the eletrolyte, where the conductor and the spacing fins are lead. The lead is converted in part to lead dioxide. Lead dioxide has a much greater volume than the original lead, and thus the expansion causes pressure on the tube sheath, which will then crack. Since it appears that these two phenomena occur together, the effect seems to be that the life expectancy of the tube battery in general is limited much more than has previously been recognized by the disintegration of the spacers that face another electrode.

An object of the present invention is to develop an improved electrode construction and method in which the conductor and the spacers or spacing fins are made in the same simple way as before, but with avoidance of the drawbacks, as discussed above.

Various solutions of the problem have been proposed. One such method is to make the spacers not integral with the conductor, such as shown for example in U.S. Pat. No. 3,082,280. There is then an entirely smooth conductor, and on it there are set a suitable number of spacers, e.g., in the form of opposed plastic fins seated on a ring. This construction has not been found suitable for some applications, partly because a very large number of spacers is required and the work of setting them on the rod is time consuming and expensive, and partly because these spacers turn out to encumber certain subsequent manufacturing steps.

It is also possible to use a cylindrical conductor entirely devoid of spacers or spacing fins. The risk that the conductor may not be centered is very great, however, and uncentered conductors cause an uneven current load on the active material in the electrode, with substantial disadvantages.

The construction, according to the invention, utilizes the metal electrode rod with the spacing fins as in the past, but on the spacers that face an electrode of opposite polarity, a coating of electrical insulating material such as a lacquer is applied to thus better distribute the current density.

These and other objects will become more fully apparent from the claims and from the description as it proceeds in conjunction with the appended drawings wherein:

Figure 1:
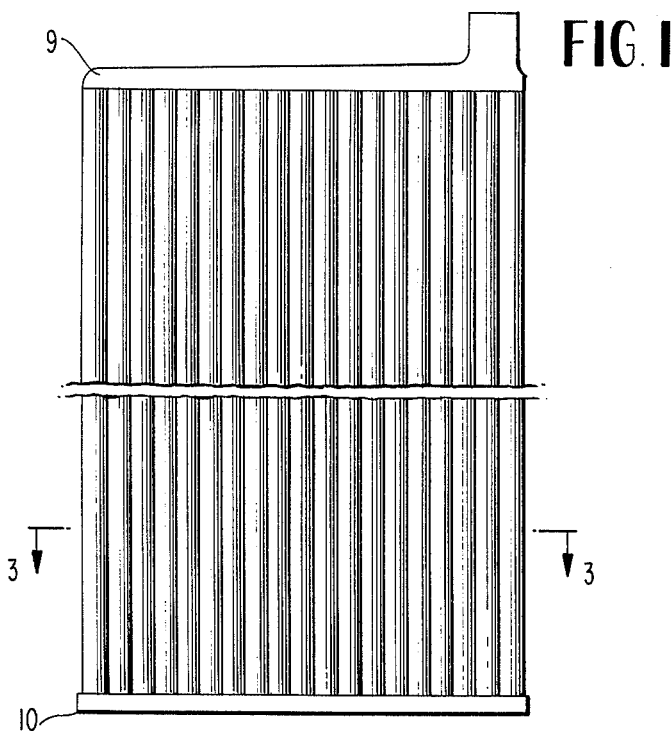
FIG. 1 is a front elevation of a tube plate of conventional construction employing the novel electrode of the present invention.
Figure 2:
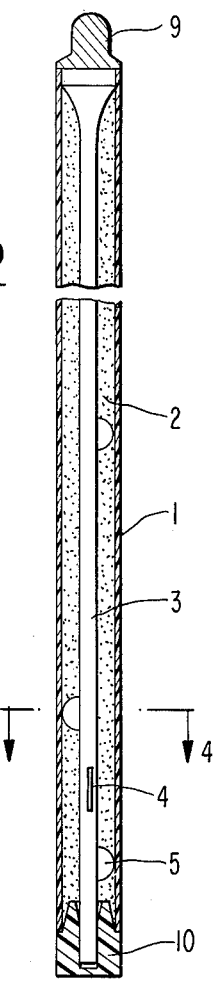
FIG. 2 is an end elevation in section, to an enlarged scale, of the tube plate of FIG. 1.
Figure 3:
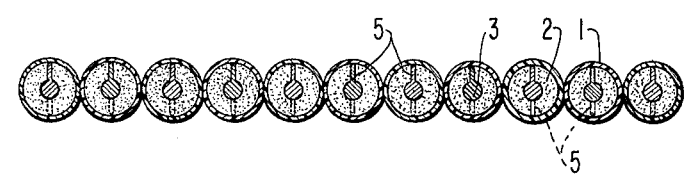
FIG. 3 is a top plan view in section, to an enlarged scale, taken along line 3—3 of FIG. 1.

In the drawings, 1 designates the tube sheath which surrounds the active material 2 in the center of which there is a conductor 3. On the conductor 3 there are suitably seated spacers or spacing fins 4 and 5 in pairs which center conductor 3 within the sheath 1. The conductors 3 are joined at the top with a pole bridge 9 and at the bottom with a support 10, usually made of a non-conductive material such as plastic, which together form the positive electrode. On either side of the tube sheath 1, there is a negative electrode 7a and 7b (see FIG. 4), and between the electrodes there are separators 6a and 6b. The remaining free space is filled with electrolyte, all as is conventional.

To avoid the disadvantages as described above, the spacing fins 4 and 5 on an electrode rod 3 according to the invention are given a coating 8 of an electrical insulating material. The insulating material coating 8 is desirably thin, about a millimeter or less, in order not to take up unnecessary space and reduce the amount of active material. The insulating coating 8 must not react with the other materials in a way that interferes with the normal operation of the battery. While the insulating materials should have a high resistance to resist the attack of the medium, this is not a necessary requirement, because even a layer that gradually becomes porous and possibly disappears in part, still has a considerable improving effect on the life expectancy of the electrode and therefore of the battery. The insulating material is preferably a thin coating of an electrolyte resistant lacquer or suitable polymer such as polyester. Polyester coatings are known and may be made, for example, from neopentyl glycol (1.1 mole), dicyclopentadiene (1.1 mole), maleic anhydride acid (1 mole), hexahydrophthalic acid (1 mole), and monomer styrene (0.6 mole) and divinyl benzene (0.6 mole).

The coating of insulating material is applied only to the spacers 4 and 5 by painting, spraying, dipping, or any other suitable method to give a thickness which will give effective protection and yet not reduce the amount of active material by a noticeable amount.

Figure 4:
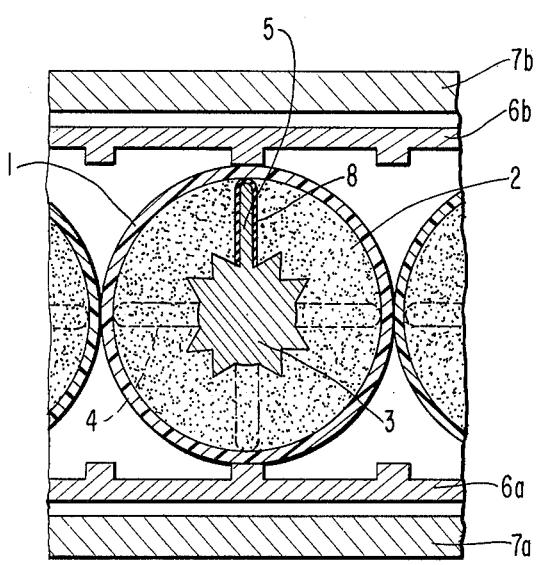
FIG. 4 is a plan view in section to an even greater enlarged scale of a single electrode tube taken along line 4—4 of FIG. 2, together with negative electrodes and separators on opposite sides thereof.

One disadvantage that may arise with electrodes of the invention is that the subsequent conversion of the active material into lead dioxide is made somewhat more difficult. Customarily, the forming process begins at the spacers, because of the peak current effect previously mentioned, and thereafter spreads out to the active material all along the conductor 3. This disadvantage can be obviated to some extent by giving the conductors 3 a configuration such that there is still some kind of peak effect. For example, the conductor 3 can be made with a cross section other than circular, for example, a many-sided star, as shown in FIG. 4. Other geometric cross sections which have sharp edges or provide increased contact surface with respect to the active material can also be effective. These cross sections may be obtained either directly in the casting of the conductor 3 or in a subsequent forming treatment.

When the insulating coating is applied to the spacers, care must be taken that other parts of the conductor 3 are not insulated. This would lead to a poorer utilization of the active material and a corresponding reduction of the capacitance of the storage battery. On the other hand, it is not necessary or desirable to cover the spacers entirely with an insulating coating 8. An uncoated region on the spacers 4 and 5 nearest the conductor 3 would have no marked importance. The insulating coating 8 can therefore suitably be applied in such a way that the conductors 3, joined in suitable numbers, are fixed in a jig such that only the surface of spacers 4 and 5 to be coated would protrude. Thereafter, the rods can be inserted in their respective sheaths 1 and the sheaths filled with active material. Finally, the tubes are mounted in the upper and lower frames 9 and 10.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. An electrode plate for a lead-acid storage battery having alternate electrodes of positive and negative polarity, said plate comprising a plurality of conductive rods connected at opposite ends in support members, each rod being surrounded by a tubular body of active material and the active material surrounded by a sheath, said rods each having a plurality of integrally formed spacing fins of the same material as the rods are made of, and a coating of electrical insulating material on those spacing fins which are adjacent to an electrode of opposite polarity.

2. An electrode plate as defined in claim 1 wherein the conductive material is lead or a lead alloy, and the electrical insulating meterial is an electrolyte resistant lacquer.

3. A method of fabricating a tube plate electrode for use in a lead-acid storage battery comprising:
   providing a plurality of lead rods that are formed to have as an integral part thereof a plurality of spacing fins;
   coating the spacing fins with a thin layer of electrical insulating material;
   mounting each rod in a tubular sheath and filling the space between the tube and the sheath with active material; and
   thereafter mounting said rods with their sheaths filled with active material in upper and lower frame members.

* * * * *